(12) United States Patent
Danilov et al.

(10) Patent No.: US 10,423,351 B1
(45) Date of Patent: Sep. 24, 2019

(54) SYSTEM AND METHOD FOR CAPACITY AND NETWORK TRAFFIC EFFICIENT DATA PROTECTION ON DISTRIBUTED STORAGE SYSTEM

(71) Applicant: EMC IP Holding Company LLC, Hopkinton, MA (US)

(72) Inventors: Mikhail Danilov, Saint Petersburg (RU); Gregory Skripko, Seattle, WA (US); Kirill Zakharov, Saint Petersburg (RU); Andrey Kurilov, Vsevolozhsk (RU); Kirill Gusakov, Saint Petersburg (RU)

(73) Assignee: EMC IP Holding Company LLC, Hopkinton, MA (US)

(*) Notice: Subject to any disclaimer, the term of this patent is extended or adjusted under 35 U.S.C. 154(b) by 41 days.

(21) Appl. No.: 15/582,163

(22) Filed: Apr. 28, 2017

(51) Int. Cl.
*G06F 3/06* (2006.01)

(52) U.S. Cl.
CPC .............. *G06F 3/064* (2013.01); *G06F 3/067* (2013.01); *G06F 3/0617* (2013.01)

(58) Field of Classification Search
CPC .............. G06F 3/00; G06F 3/06–0616; G06F 3/0617–0638; G06F 3/064–0668; G06F 3/067–0689; G06F 11/00–3696; G06F 12/00–16; G06F 13/00–4295; G06F 15/00–825; G06F 17/00–5095; G06F 21/00–88; G06F 2003/0691–0698; G06F 2009/3883; G06F 2009/45562–45595; G06F 2015/761–768; G06F 2201/00–885; G06F 2205/00–126; G06F 2206/00–20; G06F 2207/00–7295; G06F 2209/00–549; G06F 2211/00–902; G06F 2212/00–7211; G06F 2213/00–4004; G06F 2216/00–17; G06F 2221/00–2153

See application file for complete search history.

(56) References Cited

U.S. PATENT DOCUMENTS 6,449,248 B1 * 9/2002 Trasatti .................. G06F 9/505
                                                    370/216
6,862,692 B2 * 3/2005 Ulrich ..................... G06F 3/061
                                                    711/114

(Continued)

OTHER PUBLICATIONS

EMC Elastic Cloud Storage Offers Resilient Scalability for the New Generation of Workloads; Sinclair, Scott; Oct. 2015; retrieved from https://www.emc.com/collateral/white-papers/esg-wp-emc-ecs-offers-scalability-new-generation-workflows.pdf on Aug. 3, 2018 (Year: 2015).*

(Continued)

*Primary Examiner* — Daniel C. Chappell
(74) *Attorney, Agent, or Firm* — Womble Bond Dickinson (US) LLP

(57) ABSTRACT

One embodiment is related to a method for implementing a demoted chunk, comprising: replicating a first chunk from a first zone of a cloud storage system to a third zone of the cloud storage system; replicating a second chunk from a second zone of the cloud storage system to the third zone; creating an exclusive or (XOR) chunk at the third zone based at least in part on the replicated first chunk and the replicated second chunk; and marking the replicated first chunk and the replicated second chunk as demoted first chunk and demoted second chunk, respectively, at the third zone.

24 Claims, 9 Drawing Sheets

(56) References Cited

U.S. PATENT DOCUMENTS

| | | | | |
|---|---|---|---|---|
| 7,937,421 | B2* | 5/2011 | Mikesell | H04N 21/6125 |
| | | | | 707/825 |
| 7,962,779 | B2* | 6/2011 | Patel | G06F 11/1076 |
| | | | | 714/4.12 |
| 8,001,352 | B1* | 8/2011 | Chatterjee | G06F 3/0607 |
| | | | | 711/114 |
| 9,069,783 | B1* | 6/2015 | Bono | G06F 3/0689 |
| 9,152,578 | B1* | 10/2015 | Saad | G06F 12/1408 |
| 9,378,219 | B1* | 6/2016 | Bono | G06F 17/30215 |
| 9,595,979 | B2* | 3/2017 | Blaum | H03M 13/373 |
| 10,075,192 | B2* | 9/2018 | Han | H03M 13/3746 |
| 2006/0294413 | A1* | 12/2006 | Filz | G06F 8/65 |
| | | | | 714/4.4 |
| 2011/0022574 | A1* | 1/2011 | Hansen | G06F 11/2097 |
| | | | | 707/698 |
| 2016/0149814 | A1* | 5/2016 | Lu | H04L 43/0894 |
| | | | | 370/235 |
| 2018/0024853 | A1* | 1/2018 | Warfield | G06F 9/45558 |
| | | | | 718/1 |
| 2018/0181475 | A1* | 6/2018 | Danilov | G06F 11/2069 |
| 2018/0181612 | A1* | 6/2018 | Danilov | G06F 17/30283 |

OTHER PUBLICATIONS

T1: Erasure Codes for Storage Applications; Plank, James S.; 4th USENIX Conference on File and Storage Technologies; Dec. 13-16, 2005; retrieved from http://web.eecs.utk.edu/~plank/plank/papers/FAST-2005.pdf on Aug. 3, 2018 (Year: 2005).*

Amazon S3 Product Details; Amazon; Feb. 18, 2017; retrieved from https://web.archive.org/web/20170218200245/https://aws.amazon.com/s3/details/ on Aug. 3, 2018 (Year: 2017).*

EMC ECS (Elastic Cloud Storage) Architectural Guide v2.x; Redefine; Jun. 2015; retrieved from https://web.archive.org/web/20151123170624/https://www.emc.com/collateral/white-papers/h14071-ecs-architectural-guide-wp.pdf on Aug. 3, 2018 (Year: 2015).*

Efficient cooperative backup with decentralized trust management; Tran et al.; ACM Transactions on Storage, vol. 8 Issue 3, Article No. 8; Sep. 2012 (Year: 2012).*

* cited by examiner

SYSTEM AND METHOD FOR CAPACITY AND NETWORK TRAFFIC EFFICIENT DATA PROTECTION ON DISTRIBUTED STORAGE SYSTEM

FIELD OF THE INVENTION

Embodiments of the disclosure are related to data storage, and more particularly, to a method, apparatus, and system for data recovery and deletion in a remote replication cloud setup.

BACKGROUND

Cloud-based data storage solutions are becoming increasingly popular. One example is the Elastic Cloud Storage (ECS) service provided by Dell EMC. Latest trends in software architecture and development are used in these solutions to achieve outstanding scalability, availability, and serviceability.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosure relate to saving replicated data chunks as demoted chunks after the creation of an XOR chunk and using the demoted chunks in either remote replication recovery or chunk deletion to reduce or avoid remote chunk replication that would otherwise be required.

Cloud-based data storage solutions are becoming increasingly popular. In a cloud-based data storage system, data may be protected with data redundancy provided with remote replication. In short, remote replication provides enhanced protection against site failures by having multiple copies of the data, i.e., a primary copy of the data at the original site and one or more secondary copies of the data at one or more remote sites. In one embodiment, the remote replication may work at the data chunk level. The sites may be geographically distributed, e.g., on different continents, and may also be referred to as zones hereinafter. In one embodiment, a cloud storage system may support up to 8 zones. Further, the XOR (exclusive or) technique may be used with remote replication to reduce capacity overhead.

In one embodiment, all disk space is partitioned into a set of blocks of a fixed size called chunks. The chunks size may be 128 Megabytes (MBs). All user data may be stored in these chunks and the chunks may be shared by different user data objects. One chunk may contain segments of several user objects. Chunk content may be modified in append-only mode. When a chunk becomes full enough, it may be sealed. Content of sealed chunks may be immutable.

Figure 1:
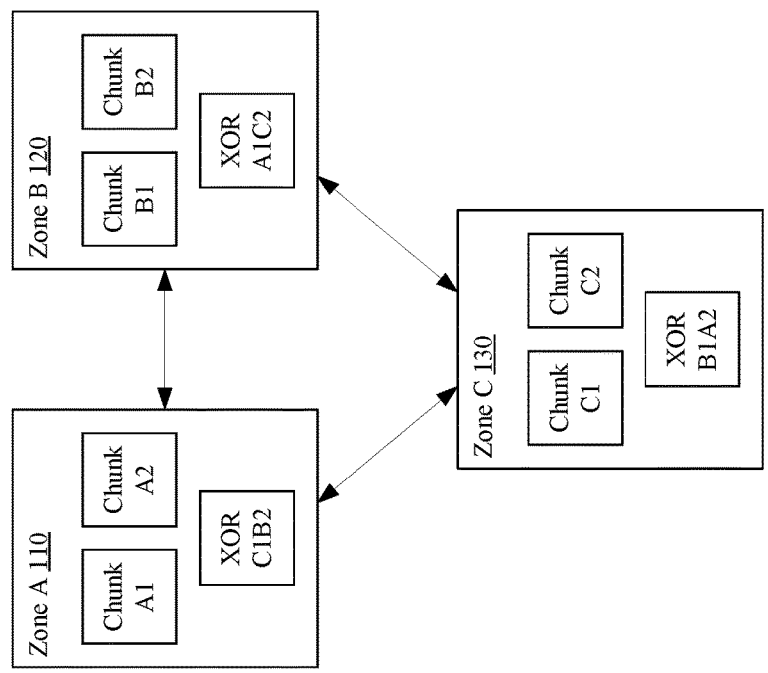
FIG. 1 is a block diagram illustrating an example cloud storage system.

Referring to FIG. 1, a block diagram illustrating an example cloud storage system 100 is shown. The example system 100 illustrated in FIG. 1 comprises three zones: Zone A 110, Zone B 120, and Zone C 130. All the zones may communicate with each other. Each zone has two data chunks of its own: Zone A 110 has Chunk A1, and Chunk A2; Zone B 120 has Chunk B1, and Chunk B2; and Zone C 130 has Chunk C1, and Chunk C2.

The example system 100 also utilizes remote replication with the XOR technique. Each zone may have an XOR chunk that is created by performing a bitwise XOR operation on two data chunks from the other two zones respectively. For example, Zone A 110 receives a copy of Chunk C1 from Zone C 130 and a copy of Chunk B2 from Zone B 120, and creates an XOR chunk: XOR C1B2=XOR (Chunk C1, Chunk B2). Similarly, Zone B 120 creates and stores an XOR A1C2 chunk, and Zone C 130 creates and stores an XOR B1A2 chunk.

With remote replication and the XOR technique, the example system 100 may recover from a failure of a single zone. In other words, disaster recovery may be performed. The process may be hereinafter referred to as remote replication recovery. For example, if Zone C 130 fails suddenly and permanently, data chunks hosted at Zone C 130 (i.e., Chunk C1 and Chunk C2) may be restored (recreated) based on data stored at Zone A 110 and at Zone B 120. In particular, after the permanent failure of Zone C 130, Zone A 110 may receive a copy of Chunk B2 from Zone B 120 and restores Chunk C1 locally with the copy of Chunk B2 and the stored XOR chunk XOR C1B2: Chunk C1=XOR (XOR C1B2, Chunk B2). Similarly, Zone B 120 may restore Chunk C2 locally: Chunk C2=XOR (XOR A1C2, Chunk A1). Therefore, Chunk C1 and Chunk C2 become available again, but are served from Zone A 110 and Zone B 120, respectively, instead of from Zone C 130. In other words, Chunk C1 stored at Zone C 130 is protected by Chunk B2 stored at Zone B 120 and the XOR chunk XOR C1B2 stored at Zone A 110, and Chunk C2 stored at Zone C 130 is protected by Chunk A1 stored at Zone A 110 and the XOR chunk XOR A1C2 stored at Zone B 120. Similarly, Chunks stored at Zone A 110 and Zone B 120 (Chunk A1, Chunk A2, Chunk B 1, and Chunk B2) are protected by respective data chunks and XOR chunks stored at remote zones.

Although FIG. 1 illustrates an example system 100 with three zones, the scheme (remote replication with XOR) may be adapted for systems with more than three zones. If the number of zones is N, the XOR technique may reduce capacity overhead by N−1 times.

Conventional Chunk Deletion

With reference back to FIG. 1, the process of chunk deletion may be complex. For example, deleting Chunk B1 stored at Zone B 120 may involve more than deleting locally Chunk B1 at Zone B 120 because Chunk A2 of Zone A 110 is protected by Chunk B1 (together with the XOR chunk XOR B1A2 of Zone C 130) and simply deleting locally Chunk B1 at Zone B 120 would cause Chunk A2 to become unprotected. Therefore, to maintain the protection of Chunk A2, a replicate of Chunk A2 needs to be created at a zone other than Zone A 110. This can be achieved by, for example, first replicating Chunk B1 from Zone B 120 to Zone C 130 and then recreating Chunk A2 at Zone C 130 based on the replicated Chunk B1 and the XOR chunk XOR B1A2. Only after the recreation of Chunk A2 at Zone C 130 is it safe to delete Chunk B1 at Zone B 120 without jeopardizing the protection of Chunk A2. Of course, the replicated Chunk B1 and the XOR chunk XOR A2B1 can also be deleted at Zone C 130.

As chunk deletion necessitates remote chunk replication over the network, the network traffic efficiency of a cloud storage system that implements remote replication and the XOR technique may be negatively affected.

In one embodiment of the disclosure, the remotely replicated copies of chunks used to produce XOR chunks may not be deleted after the creation of XOR chunks. Instead, these replicated chunks may be saved and merely demoted (or "softly referenced"). The demoted replicated chunks are kept when there is sufficient free local storage space, but can be deleted at any time to make room for new data when there is not sufficient free local storage space. Therefore, if a zone needs some chunk to perform remote replication recovery or handle chunk deletion and there is a demoted copy of it available locally, then there is no need to replicate the chunk from a remote zone again. Consequently, network traffic between zones may be reduced.

To avoid any impact on capacity use efficiency caused by the demoted chunks, the demoted chunks may be deleted at any time without verification when the storage space occupied by the demoted chunks is required to store new data. The space occupied by the demoted chunks may be reported externally as available space. Further, demoted chunks do not require protection with redundant data.

A demoted chunk may be deleted in two scenarios. First, it can be deleted when the original copy of the chunk is deleted at the zone to which the original copy belongs, and after it is withdrawn from relevant XOR chunks (i.e., it is decoupled from the protection of other data chunks), if necessary. Second, it can be deleted when there is not enough free storage space for a new chunk.

It should be appreciated that the implementation of demoted chunks does not impact the performance of write operations because 1) deletion of demoted chunks is an almost instant operation; and 2) the chunk pre-fetching mechanism that works in the background assures availability of new chunks in advance.

Remote Replication Recovery

Demoted chunks may help reduce network traffic for remote replication recovery and chunk deletion handling.

When there is a need to recover a corrupt or lost chunk, there are four possible scenarios: 1) The chunk to recover is available at a remote zone as a demoted chunk. In this case, the remote zone does not need to read any chunks from other zones. The process of recovery boils down to copying of the chunk to recover to its primary zone or marking the chunk as a regular chunk. 2) A remote zone contains demoted copies of all the peer chunks for the chunk to recover. Peer chunks are chunks that were used together with the chunk to recover to produce an XOR chunk. In this case, the remote zone does not need to read any chunks from other zones, either. It uses the local XOR chunk and the demoted copies of the peer chunks to recover content of the chunk using the XOR operation (the XOR operation is its own inverse). 3) A remote zone contains demoted copies of some, but not all, peer chunks for the chunk to recover. In this case, the remote zone needs to read only missing peer chunks from other zones. Afterwards it uses the available chunks to recover the chunk using the XOR operation. 4) A remote zone contains no demoted chunks to reuse. In this case, the storage system falls back to the conventional implementation of remote replication recovery.

Therefore, in three scenarios out of four the use of demoted chunks may result in significant reduction of network traffic produced by remote replication recovery.

Figure 2A:
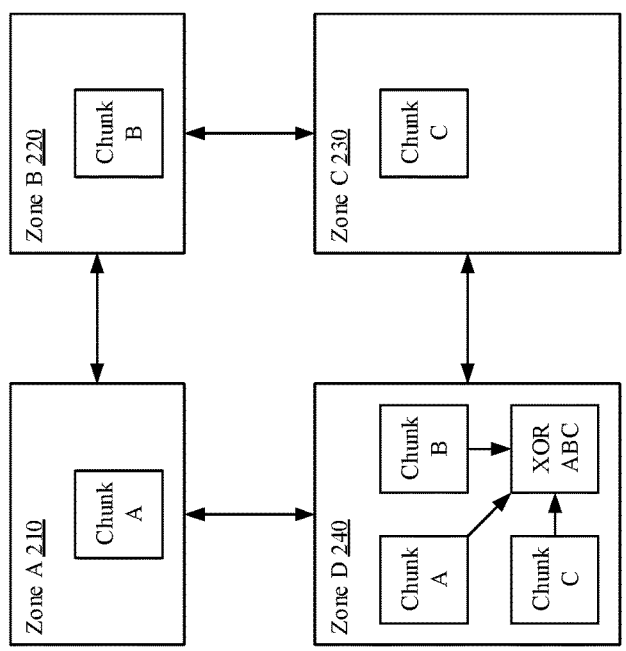
FIG. 2A is a block diagram illustrating an example environment in which embodiments of the disclosure may be practiced.

Referring to FIG. 2A, a block diagram illustrating an example environment 200 in which embodiments of the disclosure may be practiced is shown. FIG. 2 shows four zones: zones Zone A 210, Zone B 220, Zone C 230, and Zone D 240, in which zones Zone A 210, Zone B 220, and Zone C 230 contain chunks Chunk A, Chunk B, and Chunks C, respectively. An XOR chunk XOR ABC is created at Zone D 240 for chunks Chunk A, Chunk B, and Chunks C.

Figure 2B:
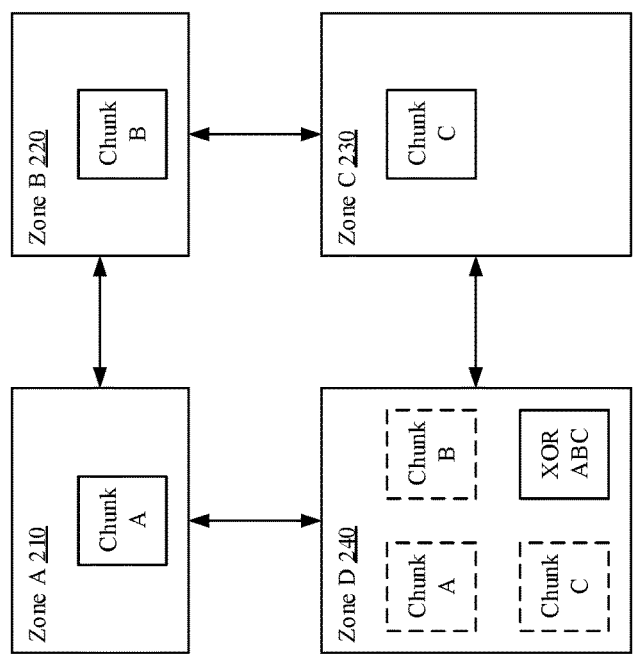
FIG. 2B is a block diagram illustrating an example environment with demoted chunks according to one embodiment of the disclosure.

Referring to FIG. 2B, a block diagram illustrating an example environment 200 with demoted chunks according to one embodiment of the disclosure is shown. After the XOR chunk XOR ABC is created at Zone D 240, Zone D 240 does not delete replicated chunks Chunk A, Chunk B, and Chunks C. Instead, Zone D demotes them (e.g., makes them "softly referenced"). Redundant data for the chunks may be deleted. Further, Zone D 240 may count and report externally capacity occupied by the demoted chunks as free when it calculates used/free capacity.

Figure 2C:
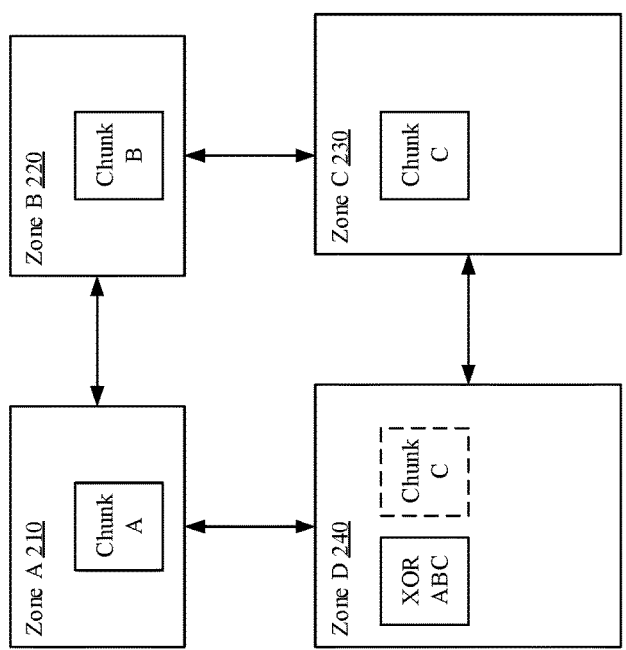
FIG. 2C is a block diagram illustrating an example environment with some of the demoted chunks deleted according to one embodiment of the disclosure.

Referring to FIG. 2C, a block diagram illustrating an example environment 200 with some of the demoted chunks deleted according to one embodiment of the disclosure is shown. Some time may have passed since the scenario illustrated in FIG. 2B, and Zone D 240 runs out of free capacity not occupied by either regular or demoted chunks. In order to obtain some free capacity Zone D 240 may delete demoted copies of Chunk A and Chunk B. The demoted copy of Chunk C is left intact.

Figure 2D:
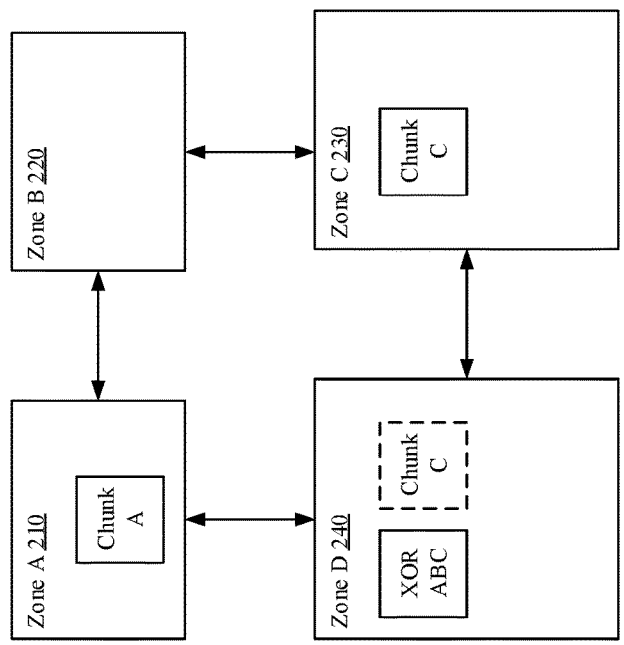
FIG. 2D is a block diagram illustrating an example environment in which a data chunk at a primary zone is lost according to one embodiment of the disclosure.

Referring to FIG. 2D, a block diagram illustrating an example environment 200 in which a data chunk at a primary zone is lost according to one embodiment of the disclosure is shown. Some time may have passed since the scenario illustrated in FIG. 2C, and Zone B 220 loses Chunk B. Therefore, Chunk B needs to be recovered. Zone D 240, which contains the XOR chunk XOR ABC, is capable of recovering Chunk B if Chunk A and Chunk C are available together with the XOR chunk XOR ABC.

Figure 2E:
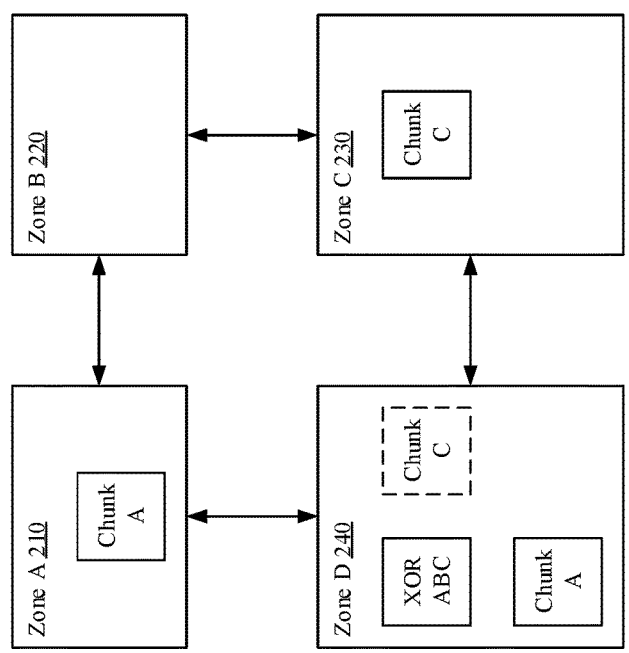
FIG. 2E is a block diagram illustrating an example environment in which a data chunk is replicated from a remote zone according to one embodiment of the disclosure.

Referring to FIG. 2E, a block diagram illustrating an example environment 200 in which a data chunk is replicated from a remote zone according to one embodiment of the disclosure is shown. To recover Chunk B, Zone D 240 needs Chunk A and Chunk C, together with the XOR chunk XOR ABC it already has. Luckily, Zone D 240 still has a demoted copy of Chunk C, so only Chunk A needs to be fetched from a remote zone. Therefore, Chunk A is replicated from Zone A 210 to Zone D 240.

Figure 2F:
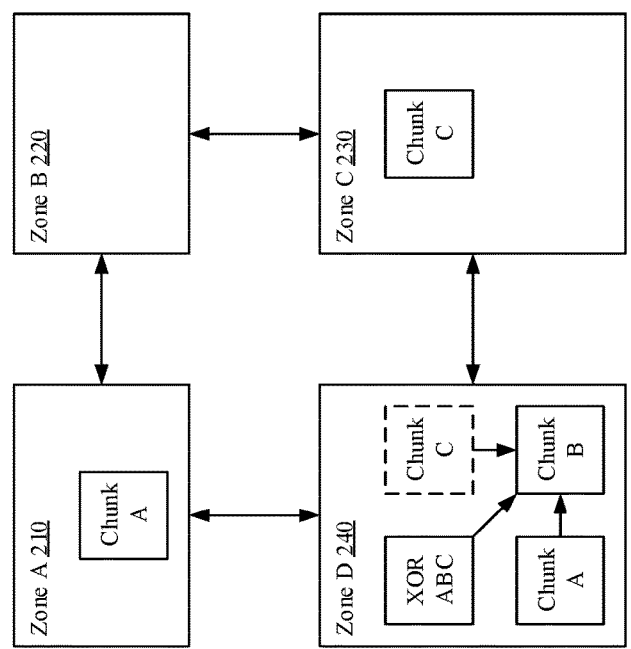
FIG. 2F is a block diagram illustrating an example environment in which a data chunk is recovered according to one embodiment of the disclosure.

Referring to FIG. 2F, a block diagram illustrating an example environment 200 in which a data chunk is recovered according to one embodiment of the disclosure is shown. After Chunk A is replicated from Zone A 210 to Zone D 240, Zone D 240 may recover Chunk B using the replicated copy of Chunk A, the demoted copy of Chunk C, and the XOR chunk XOR ABC based on the XOR operation. Therefore, instead of having to replicate from remote zones to Zone D 240 both Chunk A and Chunk C in order to recover Chunk B, which would be the case with the conventional implementation, only Chunk A is replicated from a remote zone, thanks to the demoted copy of Chunk C that was saved at Zone D 240 after the creation of the XOR chunk, reducing the network traffic by half.

Chunk Deletion

When there is a chunk to delete, there are three possible scenarios: 1) The chunk to be deleted is available at a remote zone as a demoted chunk. In this case, the remote zone with the XOR chunk does not need to replicate any chunks from other zones. The zone merely uses the XOR operation and produces a partial XOR chunk from the complete XOR chunk it owns using the demoted copy of the chunk to be deleted, thereby decoupling the chunk to be deleted from the protection of other chunks. 2) A remote zone contains demoted copies of all the peer chunks for the chunk to be deleted, but not the chunk to be deleted itself. Peer chunks are chunks that were used together with the chunk to be deleted to produce an XOR chunk. In this case, the remote zone does not need to read any chunks from other zones either. It uses demoted copies of the peer chunks to produce a partial XOR chunk for them, exclusive of the chunk to be deleted. Afterwards the chunk to be deleted can be deleted at its primary zone. 3) A remote zone contains no demoted chunks to reuse, or not all peer chunks are available locally as demoted chunks. In this case, the storage system falls back to the conventional implementation of chunk deletion (i.e., before actual deletion, it replicates the chunk to be deleted to the remote zone where the corresponding XOR chunk is stored, and performs an XOR operation on the replicated chunk and the XOR chunk to create a partial XOR chunk, thereby decoupling the chunk to be deleted from the protection of other chunks).

Therefore, in two scenarios out of three the use of demoted chunks results in reduction of network traffic produced during chunk deletion.

Referring back to FIG. 2C, assuming Chunk C is to be deleted, Chunk C needs to be decoupled from the protection of Chunk A and Chunk B. Because a demoted copy of Chunk C is available at Zone D 240, Zone D 240 may perform an XOR operation on the XOR chunk XOR ABC and the demoted copy of Chunk C to create a partial XOR chunk XOR AB, thereby decoupling Chunk C from the protection of Chunk A and Chunk B. Because the demoted copy of Chunk C is available locally at Zone D 240, replication of Chunk C from Zone C 230 to Zone D 240 is not required prior to the deletion of Chunk C at Zone C 230, saving network traffic. After the partial XOR chunk XOR AB is created, Chunk C may be safely deleted at Zone C 230. Of course, the demoted copy of Chunk C at Zone D 240 can also be safely deleted at this point.

Remote Read Cache

An additional benefit of demoted chunks is that the demoted chunks may be used as an extension of the cache used in the storage system to speed up data read operations. For example, normally, when Zone A handles a read request for data stored at Zone B, Zone A reads data from Zone B and returns it to the client. There may be a small read cache at each zone for chunks with hot data. With demoted chunks, data can be directly read from them as if they were part of the read cache. Therefore, the demoted chunks may also help improve read performance of a cloud storage system.

Figure 3:
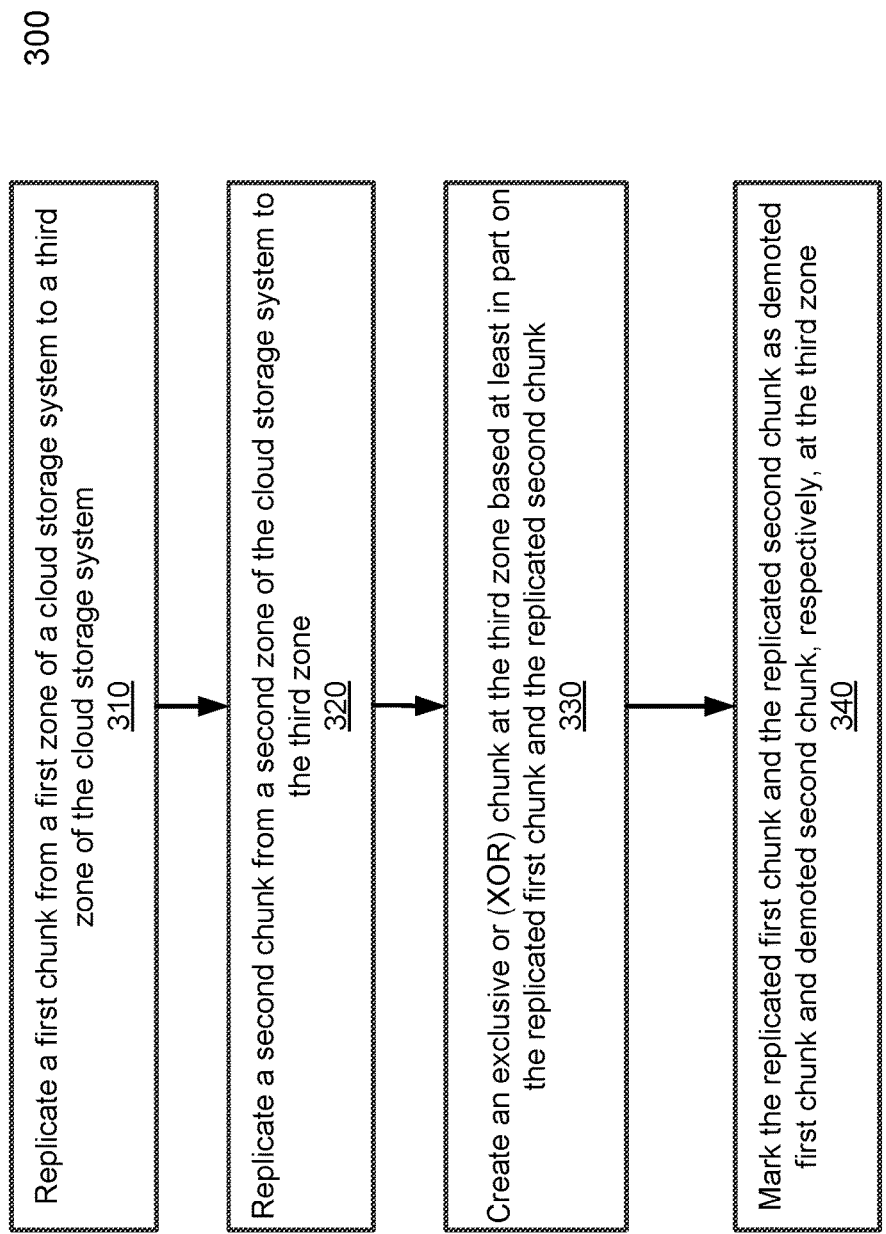
FIG. 3 is a flowchart illustrating an example method for implementing demoted chunks.

Referring to FIG. 3, a flowchart illustrating an example method 300 for implementing a demoted chunk is shown. At block 310, a first chunk may be replicated from a first zone of a cloud storage system to a third zone of the cloud storage system. At block 320, a second chunk may be replicated from a second zone of the cloud storage system to the third zone. At block 330, an exclusive or (XOR) chunk may be created at the third zone based at least in part on the replicated first chunk and the replicated second chunk. At block 340, the replicated first chunk and the replicated second chunk may be marked as demoted first chunk and demoted second chunk, respectively, at the third zone. The first, second, and third zones may be located remotely from each other.

Space occupied by the demoted first chunk and the demoted second chunk may be categorized as available space when the third zone determines storage space usage. In one embodiment, in response to a determination that the first chunk is lost at the first zone and the demoted first chunk is available at the third zone, the first chunk may be recovered by marking the demoted first chunk as a regular chunk or copying the demoted first chunk to the first zone. In another embodiment, in response to a determination that the first chunk is lost at the first zone and the demoted second chunk is available at the third zone, the first chunk may be recovered at the third zone based at least in part on the XOR chunk and the demoted second chunk. In yet another embodiment, in anticipation of deletion of the first chunk at the first zone and in response to a determination that the demoted first chunk is available at the third zone, the first chunk may be decoupled from protection of other chunks including at least the second chunk, the decoupling comprising performing an XOR operation at the third zone on the demoted first chunk and the XOR chunk to create either a partial XOR chunk or the second chunk. In a further embodiment, in anticipation of deletion of the first chunk at the first zone and in response to a determination that the demoted second chunk is available at the third zone, the first chunk may be decoupled from protection of other chunks including at least the second chunk, the decoupling comprising either marking the demoted second chunk as a regular chunk or creating a partial XOR chunk based at least in part on the demoted second chunk exclusive of the first chunk.

In a still further embodiment, in response to a client read request at the third zone comprising a read operation of the first chunk and to a determination that the demoted first chunk is available at the third zone, the demoted first chunk may be used as a read cache in fulfillment of the client read request.

Method 300 may be performed by processing logic that includes hardware (e.g. circuitry, dedicated logic, etc.), software (e.g., embodied on a non-transitory computer readable medium), or a combination thereof. For example, method 300 may be performed by processors 1501 of FIG. 4. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, according to the embodiments of the disclosure herein, in a distributed cloud storage system that implements the XOR technique, replicated data chunks used in the creation of an XOR chunk need not be deleted right away after the XOR chunk is created; rather, they may be saved locally as demoted chunks. The demoted chunks have low storage priority and can be deleted at any time to make room for new chunks. However, the available demoted chunks may be useful in either remote replication recovery or chunk deletion. With the right demoted chunks available locally, replication of remote chunks may be reduced or avoided in remote replication recovery and chunk deletion, thereby saving network traffic.

Figure 4:
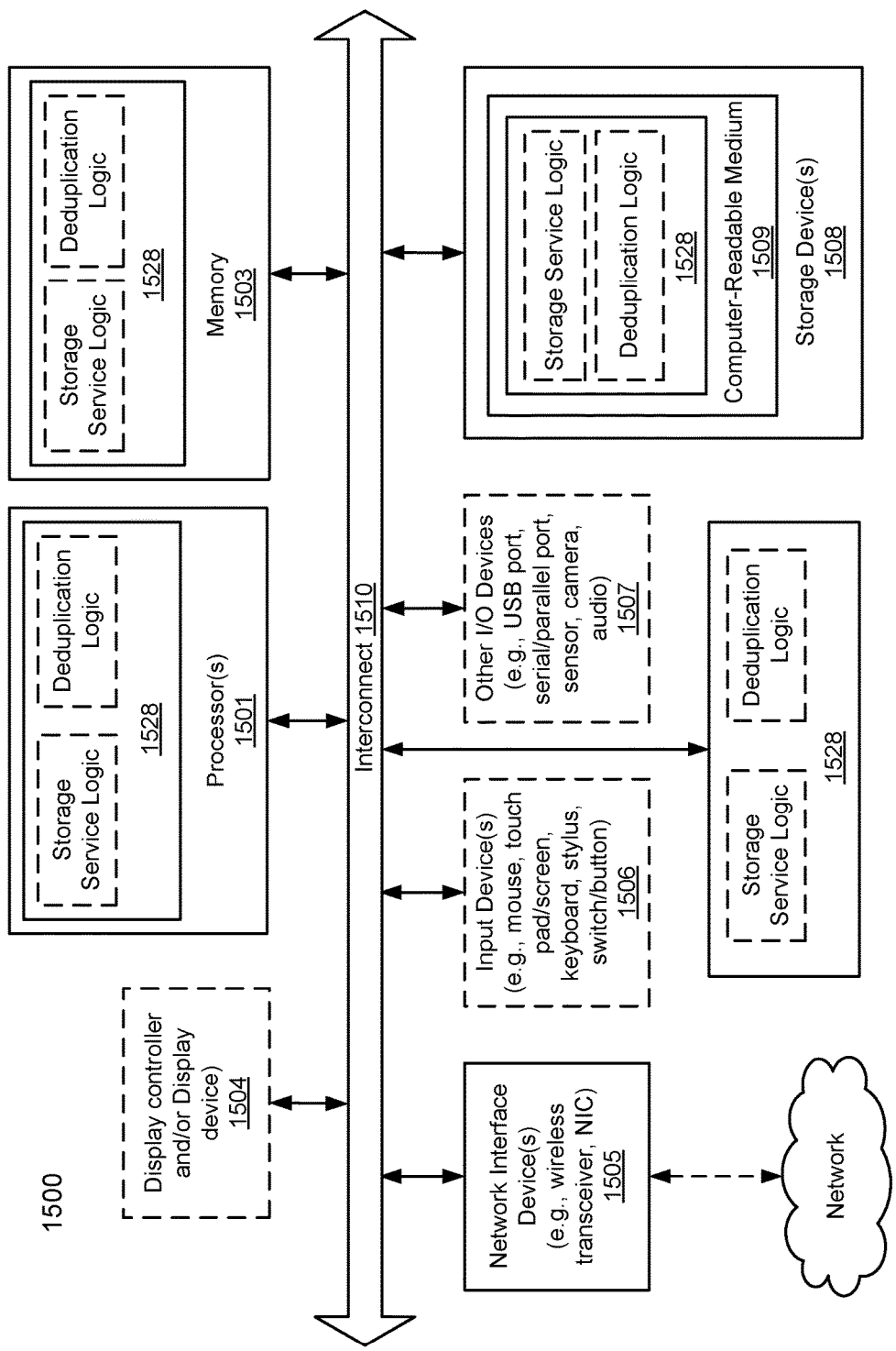
FIG. 4 is a block diagram illustrating an example of a data processing system which may be used with one embodiment of the disclosure.

FIG. 4 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the disclosure.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for implementing a demoted chunk, comprising:
    replicating a first chunk from a first zone of a cloud storage system to a third zone of the cloud storage system;
    replicating a second chunk from a second zone of the cloud storage system to the third zone;
    creating an exclusive or (XOR) chunk at the third zone based at least in part on the replicated first chunk and the replicated second chunk; and
    subsequent to the creation of the XOR chunk at the third zone based at least in part on the replicated first chunk and the replicated second chunk, marking the replicated first chunk and the replicated second chunk as locally demoted first chunk and locally demoted second chunk, respectively, at the third zone, wherein new data is allowed to be written at the third zone to space corresponding to any locally demoted chunk at the third zone, and wherein data of any locally demoted chunk at the third zone remains available unless and until the corresponding space at the third zone is overwritten.

2. The method of claim 1, wherein the first, second, and third zones are located remotely from each other.

3. The method of claim 1, wherein space occupied by the locally demoted first chunk and the locally demoted second chunk is categorized as available space at the third zone when the third zone determines storage space usage.

4. The method of claim 1, wherein in response to a determination that the first chunk is lost at the first zone and the locally demoted first chunk at the third zone is available at the third zone, the first chunk is recovered by marking the locally demoted first chunk at the third zone as a regular chunk or copying the locally demoted first chunk at the third zone to the first zone.

5. The method of claim 1, wherein in response to a determination that the first chunk is lost at the first zone and the locally demoted second chunk at the third zone is available at the third zone, the first chunk is recovered at the third zone based at least in part on the XOR chunk and the locally demoted second chunk at the third zone.

6. The method of claim 1, wherein in anticipation of deletion of the first chunk at the first zone and in response to a determination that the locally demoted first chunk at the third zone is available at the third zone, the first chunk is decoupled from protection of other chunks including at least the second chunk, the decoupling comprising performing an XOR operation at the third zone on the locally demoted first chunk at the third zone and the XOR chunk to create either a partial XOR chunk or the second chunk.

7. The method of claim 1, wherein in anticipation of deletion of the first chunk at the first zone and in response to a determination that the locally demoted second chunk at the third zone is available at the third zone, the first chunk is decoupled from protection of other chunks including at least the second chunk, the decoupling comprising either marking the locally demoted second data chunk at the third zone as a regular chunk or creating a partial XOR chunk based at least in part on the locally demoted second chunk at the third zone, the partial XOR chunk being decoupled from the first chunk.

8. The method of claim 1, wherein in response to a client read request at the third zone comprising a read operation of the first chunk and to a determination that the locally demoted first chunk at the third zone is available at the third zone, the locally demoted first chunk at the third zone is used as a read cache in fulfillment of the client read request.

9. A non-transitory machine-readable medium having instructions stored therein which, when executed by a processor, cause the processor to perform storage operations, the operations comprising:
    replicating a first chunk from a first zone of a cloud storage system to a third zone of the cloud storage system;
    replicating a second chunk from a second zone of the cloud storage system to the third zone;
    creating an exclusive or (XOR) chunk at the third zone based at least in part on the replicated first chunk and the replicated second chunk; and
    subsequent to the creation of the XOR chunk at the third zone based at least in part on the replicated first chunk and the replicated second chunk, marking the replicated first chunk and the replicated second chunk as locally demoted first chunk and locally demoted second chunk, respectively, at the third zone, wherein new data is allowed to be written at the third zone to space corresponding to any locally demoted chunk at the third zone, and wherein data of any locally demoted chunk at the third zone remains available unless and until the corresponding space at the third zone is overwritten.

10. The non-transitory machine-readable medium of claim 9, wherein the first, second, and third zones are located remotely from each other.

11. The non-transitory machine-readable medium of claim 9, wherein space occupied by the locally demoted first chunk at the third zone and the locally demoted second chunk at the third zone is categorized as available space when the third zone determines storage space usage.

12. The non-transitory machine-readable medium of claim 9, wherein in response to a determination that the first chunk is lost at the first zone and the locally demoted first chunk at the third zone is available at the third zone, the first chunk is recovered by marking the locally demoted first chunk at the third zone as a regular chunk or copying the locally demoted first chunk at the third zone to the first zone.

13. The non-transitory machine-readable medium of claim 9, wherein in response to a determination that the first chunk is lost at the first zone and the locally demoted second chunk at the third zone is available at the third zone, the first chunk is recovered at the third zone based at least in part on the XOR chunk and the locally demoted second chunk at the third zone.

14. The non-transitory machine-readable medium of claim 9, wherein in anticipation of deletion of the first chunk at the first zone and in response to a determination that the locally demoted first chunk at the third zone is available at the third zone, the first chunk is decoupled from protection of other chunks including at least the second chunk, the decoupling comprising performing an XOR operation at the third zone on the locally demoted first chunk at the third zone and the XOR chunk to create either a partial XOR chunk or the second chunk.

15. The non-transitory machine-readable medium of claim 9, wherein in anticipation of deletion of the first chunk at the first zone and in response to a determination that the locally demoted second chunk at the third zone is available at the third zone, the first chunk is decoupled from protection of other chunks including at least the second chunk, the decoupling comprising either marking the locally demoted second data chunk at the third zone as a regular chunk or creating a partial XOR chunk based at least in part on the locally demoted second chunk at the third zone, the partial XOR chunk being decoupled from the first chunk.

16. The non-transitory machine-readable medium of claim 9, wherein in response to a client read request at the third zone comprising a read operation of the first chunk and to a determination that the locally demoted first chunk at the third zone is available at the third zone, the locally demoted first chunk at the third zone is used as a read cache in fulfillment of the client read request.

17. A data processing system, comprising:
a processor; and
a memory coupled to the processor storing instructions which, when executed by the processor, cause the processor to perform storage operations, the operations including:
replicating a first chunk from a first zone of a cloud storage system to a third zone of the cloud storage system;
replicating a second chunk from a second zone of the cloud storage system to the third zone;
creating an exclusive or (XOR) chunk at the third zone based at least in part on the replicated first chunk and the replicated second chunk; and
subsequent to the creation of the XOR chunk at the third zone based at least in part on the replicated first chunk and the replicated second chunk, marking the replicated first chunk and the replicated second chunk as locally demoted first chunk and locally demoted second chunk, respectively, at the third zone, wherein new data is allowed to be written at the third zone to space corresponding to any locally demoted chunk at the third zone, and wherein data of any locally demoted chunk at the third zone remains available unless and until the corresponding space at the third zone is overwritten.

18. The data processing system of claim 17, wherein the first, second, and third zones are located remotely from each other.

19. The data processing system of claim 17, wherein space occupied by the locally demoted first chunk and the locally demoted second chunk is categorized as available space at the third zone when the third zone determines storage space usage.

20. The data processing system of claim 17, wherein in response to a determination that the first chunk is lost at the first zone and the locally demoted first chunk at the third zone is available at the third zone, the first chunk is recovered by marking the locally demoted first chunk at the third zone as a regular chunk or copying the locally demoted first chunk at the third zone to the first zone.

21. The data processing system of claim 17, wherein in response to a determination that the first chunk is lost at the first zone and the locally demoted second chunk at the third zone is available at the third zone, the first chunk is recovered at the third zone based at least in part on the XOR chunk and the locally demoted second chunk at the third zone.

22. The data processing system of claim 17, wherein in anticipation of deletion of the first chunk at the first zone and in response to a determination that the locally demoted first chunk at the third zone is available at the third zone, the first chunk is decoupled from protection of other chunks including at least the second chunk, the decoupling comprising performing an XOR operation at the third zone on the locally demoted first chunk at the third zone and the XOR chunk to create either a partial XOR chunk or the second chunk.

23. The data processing system of claim 17, wherein in anticipation of deletion of the first chunk at the first zone and in response to a determination that the locally demoted second chunk at the third zone is available at the third zone, the first chunk is decoupled from protection of other chunks including at least the second chunk, the decoupling comprising either marking the locally demoted second data chunk at the third zone as a regular chunk or creating a partial XOR chunk based at least in part on the demoted second chunk, the partial XOR chunk being decoupled from the first chunk.

24. The data processing system of claim 17, wherein in response to a client read request at the third zone comprising a read operation of the first chunk and to a determination that the locally demoted first chunk at the third zone is used is available at the third zone, the locally demoted first chunk at the third zone as a read cache in fulfillment of the client read request.

* * * * *